(12) United States Patent
Cheng

(10) Patent No.: US 6,781,820 B2
(45) Date of Patent: Aug. 24, 2004

(54) FOLDABLE AND HANG-ABLE LIQUID CRYSTAL DISPLAY APPARATUS

(75) Inventor: Kai-Jen Cheng, Taipei (TW)

(73) Assignee: Hann Star Display Corp., Tao Yuan Hsien (TW)

( * ) Notice: Subject to any disclaimer, the term of this patent is extended or adjusted under 35 U.S.C. 154(b) by 0 days.

(21) Appl. No.: 10/253,863

(22) Filed: Sep. 25, 2002

(65) Prior Publication Data

US 2004/0008476 A1 Jan. 15, 2004

(30) Foreign Application Priority Data

Jul. 9, 2002 (TW) ..................................... 91210422 U

(51) Int. Cl.[7] .................................................. G06F 1/16
(52) U.S. Cl. ...................... 361/681; 248/917; 348/552; 312/223.2
(58) Field of Search .................................. 361/674–687, 361/724–727; 16/342; 248/917–923; 364/708.1; 347/207, 552; 312/223.1–223.6

(56) References Cited

U.S. PATENT DOCUMENTS

| | | | | |
|---|---|---|---|---|
| 5,719,799 A | * | 2/1998 | Isashi | 708/105 |
| 5,771,152 A | * | 6/1998 | Crompton et al. | 361/681 |
| 6,035,214 A | * | 3/2000 | Henderson | 455/556.1 |
| 6,152,550 A | * | 11/2000 | Yamaguchi | 312/223.2 |

* cited by examiner

Primary Examiner—Hung Van Duong
(74) Attorney, Agent, or Firm—Troxell Law Office PLLC

(57) ABSTRACT

A foldable and hang-able liquid crystal display apparatus is introduced to have a display panel and a device base pivotally connected with the display panel. The device base further includes a first side, a second side opposing to the first side, and a lateral side connecting the first side and the second side. On the second side, a plurality of holes is provided for the apparatus to be hooked on a wall. When the device base is pivoted to fold up with the display panel, the first side and a back side of the display panel are complementarily contacted.

20 Claims, 5 Drawing Sheets

FOLDABLE AND HANG-ABLE LIQUID CRYSTAL DISPLAY APPARATUS

BACKGROUND OF THE INVENTION (1) Field of the Invention

The invention relates to a foldable and hand-able liquid crystal display apparatus, and more particularly to a room-saving apparatus which can be directly hanged to a wall without removing a base of the apparatus.

(2) Description of the Prior Art

In the industry of computers and electronic products, the liquid crystal display apparatus is usually equipped with a device base for resting the whole apparatus on a desk or the like platform. The device base is usually pivotally engaged at the rear of the display panel by a universal joint with a limited rotational range. Compared with a conventional cathode radiation display, the liquid crystal display apparatus can provide a better room fit. It is also found in the market that some the liquid crystal display apparatus may provide a wall-hang alternative. Definitely, the liquid crystal display apparatus with both desktop and wall-hang selections would be the trend in the industry.

In the art, the liquid crystal display apparatus with both desktop and wall-hang selections is usually sold with a wall-hang accessory. While the liquid crystal display apparatus is prepared to be wall-hung, the device base is usually needed to be separated from the display panel firstly, and then the wall-hang accessory can be used to make the display panel wall-hung possible. On the other hand, a room is still required for resting the device base which is now wired to the display panel. Upon such an arrangement, following disadvantages are obvious.

1. While the display panel is wall-hung, the device base is separately arranged by which the extension wiring between the display panel and the device base make complicated the wall-hang operation.
2. The presence of the wall-hang accessory implies to the user that the wall-hung style of the liquid crystal display apparatus is an inferior choice of installing the apparatus.
3. The extension wiring, the wall-hang accessory, or other functional cartridges for the liquid crystal display apparatus in the art are surely not standard parts to be specially designed to the wall-hang operation, and so the usage of those parts are not convenient so far.

Therefore, to develop an improved liquid crystal display apparatus with both desktop and wall-hang standard selections is definitely worthy and welcome in the art.

SUMMARY OF THE INVENTION

Accordingly, it is a primary object of the present invention to provide a foldable and hang-able liquid crystal display apparatus whose device base and display panel are complementarily and pivotally engaged. The apparatus can be folded up into a compact structure for being hung as a whole, without separating the device base from the display panel.

The foldable and hang-able liquid crystal display apparatus in accordance with the present invention can include a display panel, a housing for installing the display panel, and a device base.

The housing further comprises a pivotal side and a back side.

The device base, preferably formed as a box structure, further comprises a co-pivoting side, a first side, a second side, and a lateral side connecting the first side and the second side. The co-pivoting side can pair with the pivotal side of the housing for constructing a hinge means for pivotally engaging the housing and the device base, in which the hinge means has a plurality of predetermined anchoring positions. The first side facing the back side of the housing can form a complementary contact with the back side while the device base and the housing are folded up through the hinge means. The second side opposed to the first side further includes a plurality of hang holes for wall-hanging.

In one embodiment of the present invention, the first side of the device base can further comprise a receiving valley and a removable shield. The receiving valley further provides thereinside an electronic interface for engageable with a foreign functional cartridge. The shield is level with the first side while the shield is fitted to the receiving valley.

In one embodiment of the present invention, the first side of the device base can further comprise a receiving valley for receiving a foreign functional cartridge. Also, the functional cartridge is level with the first side while the functional cartridge engages with an electronic interface inside the receiving valley.

In one embodiment of the present invention, the lateral side of the device base can further comprise an electronic interface engageable with a foreign functional cartridge. While the functional cartridge engages with the electronic interface, both sides of the functional cartridge are level to the first side and the second side.

In one embodiment of the present invention, the lateral side of the device base can further comprise a hook, preferably to be a hidden hook. The hook has a storage state and an application state. When the hook poses the storage state, a part of the hook is located inside the device base. Preferably, the hook can further comprise a spring for providing resilience to have the hook switching between the storage state and the application state.

In the present invention, the hook can be preferably formed as a product having a reinforce metal and a plastic body for enhancing the strength of the hook.

In one embodiment of the present invention, the foldable and hang-able liquid crystal display apparatus can further comprise a supporting frame for loading a transformer. The supporting frame has at least a connection point to engage with at least an adjustable hole located on the lateral side of the device base. Moreover, both sides of a combination of the transformer and the supporting frame are level to the first side and the second side of the device base while the combination is engaged with the device base by engaging the connection point and the adjustable hole.

Preferably, the supporting frame of the present invention can further comprise a wire-wrapping part for wrapping a wire of the transformer.

All these objects are achieved by the foldable and hang-able liquid crystal display apparatus described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a fordable and hand-able liquid crystal display apparatus. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

In the following description, those components having the same function but different profiles or locations are named and labeled by the same so as to achieve consistency in presenting the present invention.

Figure 1:
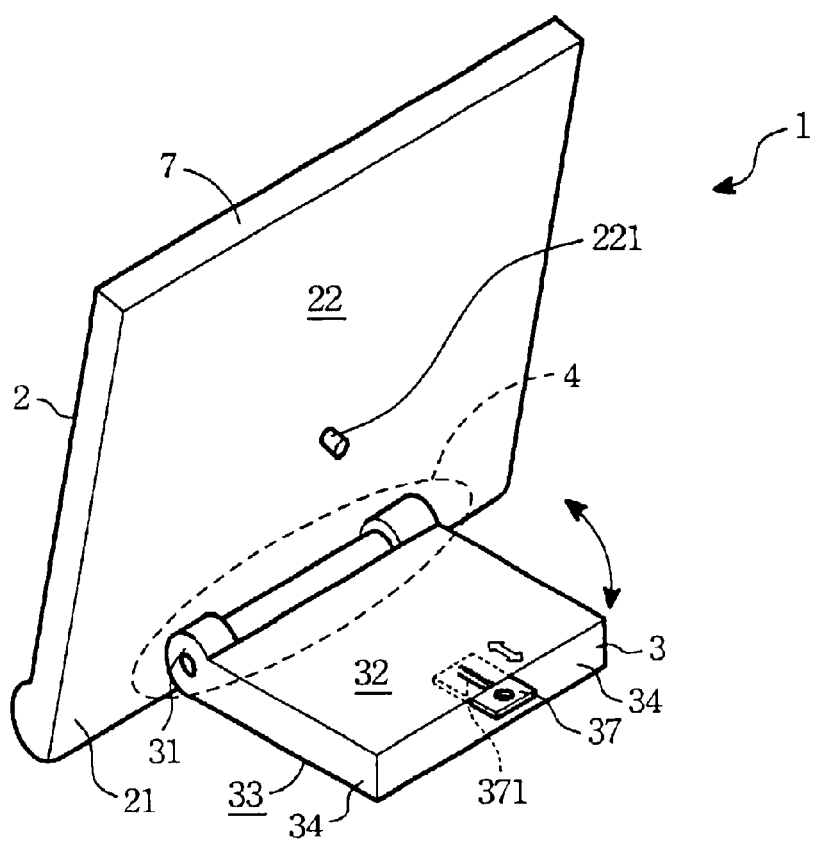
FIG. 1 is a perspective view of a first embodiment of the fordable and hand-able liquid crystal display apparatus in accordance with the present invention.

Referring now to FIG. 1, a first embodiment of the foldable and hang-able liquid crystal display apparatus 1 in accordance with the present invention is shown to include a display panel 2, a housing 7 for installing the display panel 2, and a device base 3 pivotally connected with the housing 7.

The housing 7 further includes a pivotal side 21 and a back side 22.

Figure 2:
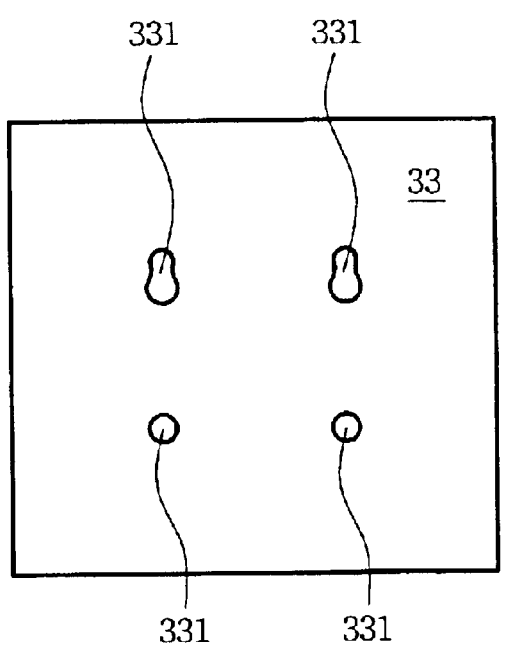
FIG. 2 is a schematic bottom view of a second side of the device base of FIG. 1.

The device base 3 for holding electronic components of the apparatus preferably formed as a box structure, further includes a co-pivoting side 31, a first side 32, a second side 33, and a lateral side 34 connecting the first side 32 and the second side 33. The co-pivoting side 31 can pair with the pivotal side 21 of the housing 7 for constructing a hinge means 4 for pivotally engaging the housing 7 and the device base 3, in which the hinge means 4 has a plurality of predetermined anchoring positions. Those predetermined anchoring positions include at least a wall-hang position of the housing 7 folded with the device base 3 and a desktop position of the housing 7 formed a predetermined angle with the device base 3. The first side 32 facing the back side 22 of the housing 7 can form a complementary contact with the back side 22 while the device base 3 and the housing 7 are folded through the hinge means 4, i.e. the wall-hang position of the hinge means 4. The second side 33 is located oppositely to the first side 32 can further include a plurality of hang holes 331 for wall-hanging as shown in FIG. 2. While the apparatus is at a desktop application, the second side 33 is used to sit on the desk.

Figure 7:
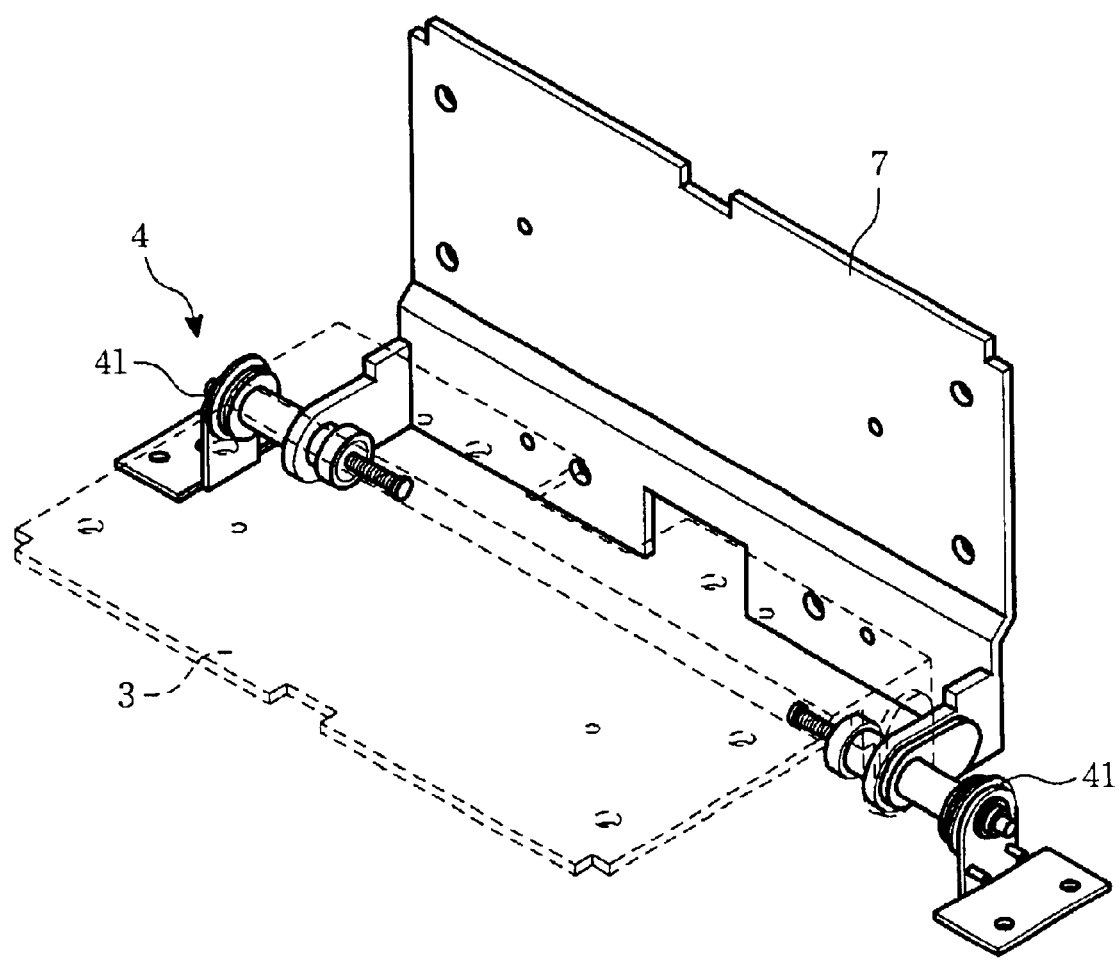
FIG. 7 is a perspective view of a preferred hinge means of the fordable and hand-able liquid crystal display apparatus in accordance with the present invention.

Referring now to FIG. 7, the hinge means 4 of the present invention can be formed by pairing two pivotal structures 41. Thereby, the housing 7 (partially shown in FIG. 7) and the device base 3 (also partially shown in FIG. 7) can be integrated to form a fordable pair. Preferably, by an appropriate arrangement upon the pivotal structures 41, the hinge means 4 can thus present a plurality of the predetermined anchoring positions. In the present invention, descriptions regarding the hinge means 4 as well as the pivotal structures 41 will be omitted thereafter because various references have already existed in the art (for example, Taiwan patents of the Publication numbers 452099 and 470173) and can be adopted directly to the present invention by the skilled.

Referring to FIG. 1, the embodiment of the present invention can comprise a hook 37 located at the lateral side 34 of the device base 3. The hook 37 is used to assist the wall-hanging of the present invention and preferably formed hidden-ably. In the present invention, the hook 37 can have a storage state and an application state. When the hook 37 poses the storage state, a part of the hook 37 can be stored inside the device base 3.

Figure 8:
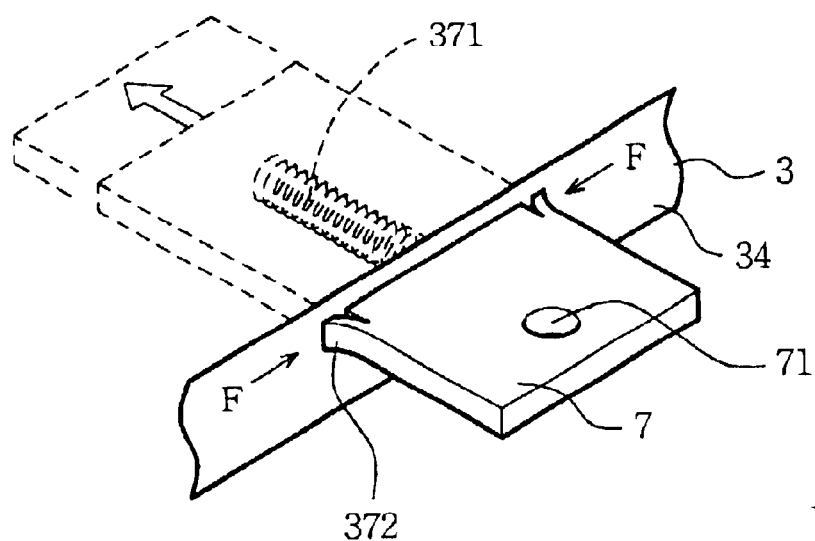
FIG. 8 is a perspective view of a preferred hook of the fordable and hand-able liquid crystal display apparatus in accordance with the present invention.

Referring now to FIG. 8, when the hook 37 can further include a spring 371 and at least a directional anchoring thumb 372 (two in the figure). The spring 371 is used to provide required resilience for enabling the hook 37 to switch between the storage state and the application state. When the hook 37 poses at the application state as shown, the directional anchoring thumb 372 can cooperate with the lateral side 34 of the device base 3 to form a block state for ensuring the related positions in between. While the directional anchoring thumb 372 is depressed by the forcing F onto the hook 37, the block state of the directional anchoring thumb 372 as well as the application state of the hook 37 can be released and meanwhile the hook 37 can be automatically switched from the application state to the storage state (as a motion following a dual-head arrow shown in FIG. 8) by the forcing provided by the spring 371.

In the present invention, the hook 37 can be preferably formed as a product having a reinforce metal and a plastic body to enhance the strength required for sustaining the weight of the apparatus while in the wall-hang state. As shown in FIG. 8 and FIG. 1, the hook 37 can further include a hook hole 71 and the back side 22 of the housing 7 can further comprise a respective protrusion 221 engageable with the hook hole 71. The pair of the hook hole 71 and the protrusion 221 can ensure the display panel 2 not to be accidentally unfolded while the apparatus in the wall-hang state.

Referring now to FIG. 2, the second side 33 of the device base 3 of the first embodiment of the present invention can have a plurality of hanging holes 331 for engaging with appropriate hardware located on a wall or the like for performing the wall-hanging of the apparatus.

Figure 3:
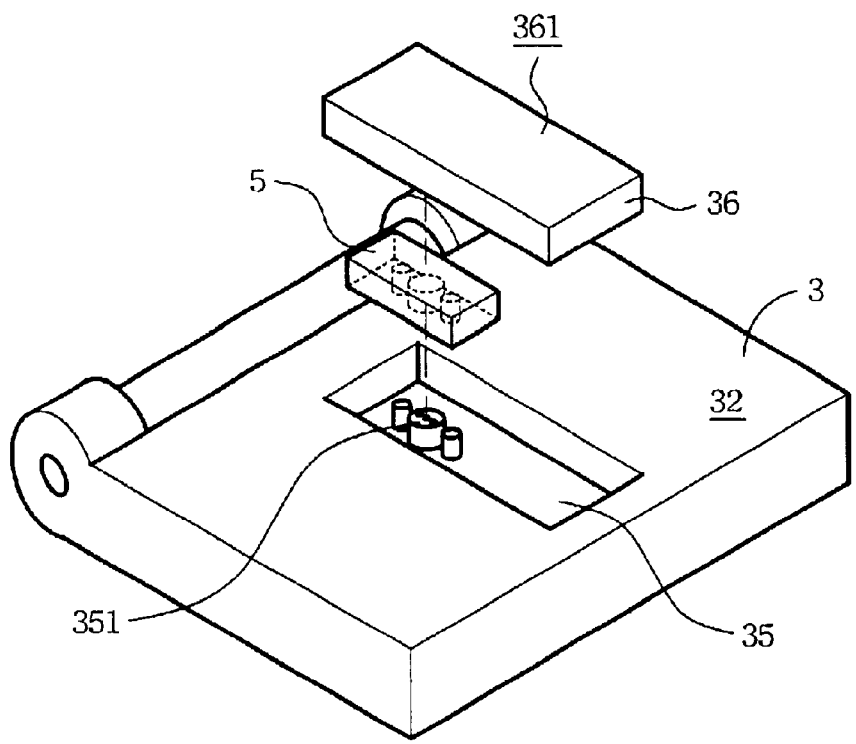
FIG. 3 is a partial perspective view of a second embodiment of the device base of the fordable and hand-able liquid crystal display apparatus in accordance with the present invention.

Referring now to FIG. 3, the device base 3 of a second embodiment of the present invention is partially shown. In this embodiment, the first side 32 of the device base 3 can further comprise a receiving valley 35 and a removable shield 36. The receiving valley 35 further provides therein-side an electronic interface 351 for engageable with a foreign functional cartridge 5. When the shield 36 is fitted to the receiving valley 36 with or without the functional cartridge 5, an outer plane 361 of the shield 36 is level with the first side 32 so that no profile interference can occur between the device base 3 and the housing 7 during the wall-hang application of the apparatus.

Figure 4:
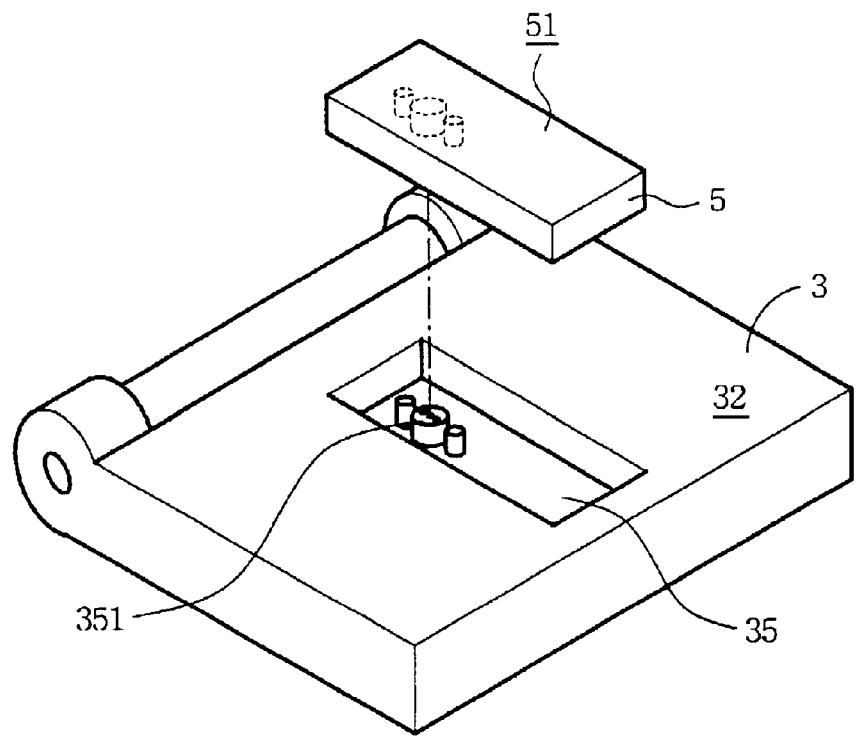
FIG. 4 is a partial perspective view of a third embodiment of the device base of the fordable and hand-able liquid crystal display apparatus in accordance with the present invention.

Referring now to FIG. 4, the device base 3 of a third embodiment of the present invention is partially shown.

Compared with the second embodiment, the third embodiment does not include the shield. In this embodiment, the first side 32 of the device base 3 comprises a receiving valley 35 for receiving a foreign functional cartridge 5. Similarly, the receiving valley 35 further provides thereinside an electronic interface 351 to engage with the foreign functional cartridge 5. When the functional cartridge 5 is located inside the receiving valley 36, an outer surface 51 of the functional cartridge 5 is level with the first side 32 so that no profile interference can occur between the device base 3 and the housing 7 during the wall-hang application of the apparatus.

Figure 5:
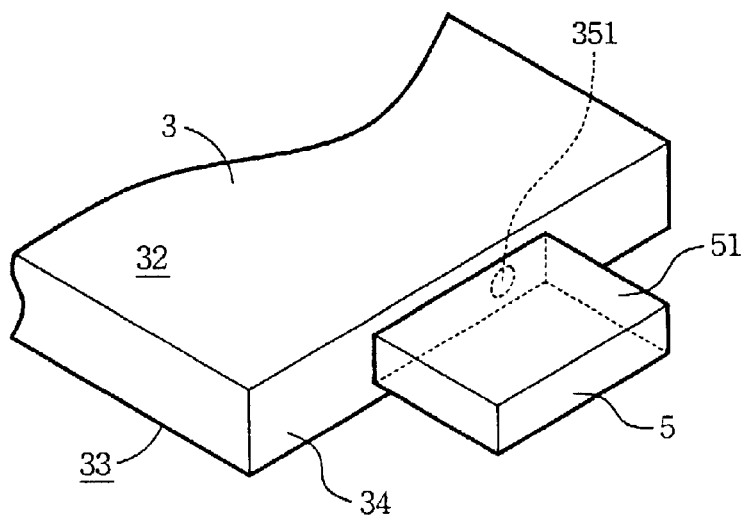
FIG. 5 is a partial perspective view of a fourth embodiment of the device base of the fordable and hand-able liquid crystal display apparatus in accordance with the present invention.

Referring now to FIG. 5, the device base 3 of a fourth embodiment of the present invention is partially shown. In this embodiment, the lateral side 34 of the device base 3 can further have an electronic interface 351 for engaging with a foreign functional cartridge 5. While the functional cartridge 5 engages with the electronic interface 351, both outer sides 51 of the functional cartridge 5 are level to the first side 32 and the second side 33 of the device base 3 so that no profile interference can occur between the device base 3 and the housing 7 during the wall-hang application of the apparatus.

Figure 6:
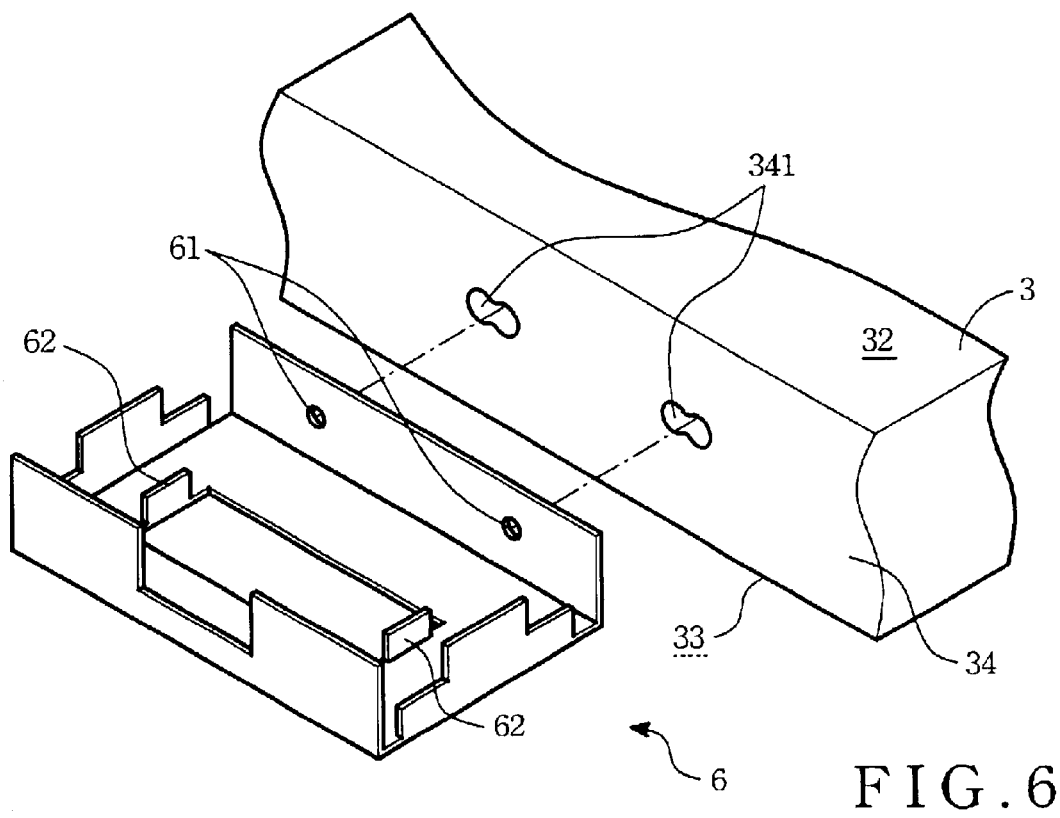
FIG. 6 is a partial perspective view of a fifth embodiment of the device base of the fordable and hand-able liquid crystal display apparatus in accordance with the present invention.

Referring now to FIG. 6, a fifth embodiment of the present invention is partially shown, In this embodiment, the foldable and hang-able liquid crystal display apparatus can further comprise a supporting frame 6 for loading a transformer (not shown). The supporting frame 6 is designed to engage with the lateral side 34 of the device base 3. The supporting frame 6 has at least a connection point 61 to engage with at least an adjustable hole 341 located on the lateral side 34 of the device base 3. Both outer sides of a combination of the transformer and the supporting frame 6 are level to the first side 32 and the second side 33 of the device base 3 while the combination is engaged with the device base 3 by engaging the connection point 61 and the adjustable hole 341.

Figure 9:
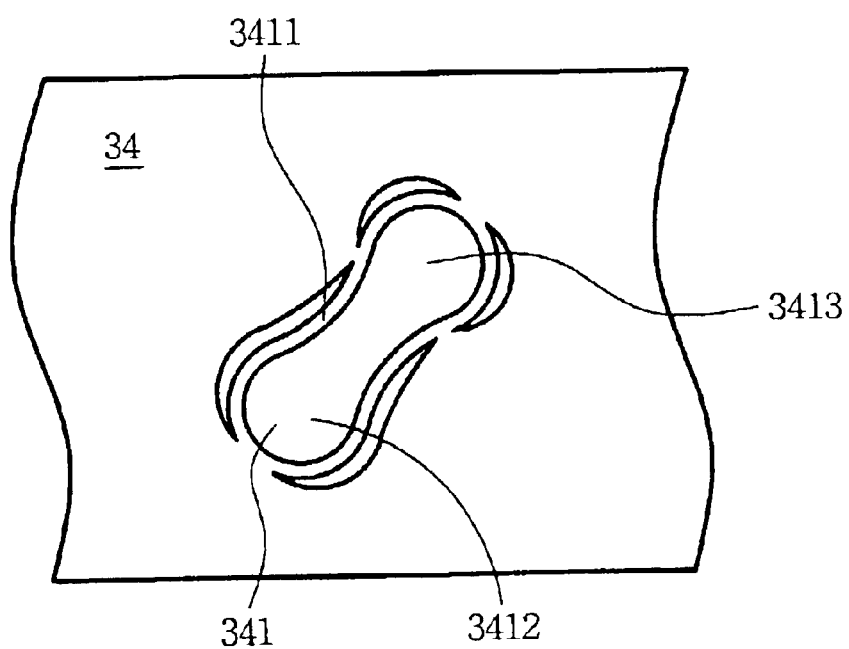
FIG. 9 is a schematic view of a preferred adjustable hole of the fordable and hand-able liquid crystal display apparatus in accordance with the present invention.

Referring now to FIG. 9, a preferred embodiment of the adjustable hole 341 is shown. The adjustable hole 341 provides two locating zones 3412 and 3413. When the device base 3 is rested on a plane or a platform, the supporting frame 6 as well as the transformer can be adjusted to use the locating zone 3412. On the other hand, when the device base 3 is folded onto the housing 7, the supporting frame 6 as well as the transformer can then be adjusted to use the locating zone 3413 for avoiding any profile interference between the housing 7 and the device base 3.

As shown in FIG. 9, the adjustable holes 341 are located on the lateral side 34 of the device base 3. Preferably, the adjustable hole 341 can be presented with an "8"-shaped pattern having a plurality of inner elastic ribs 3411. Upon such an arrangement, the respective connection point 61 of the supporting frame 6 as shown in FIG. 6 can be switched elastically between the locating zones 3412 and 3413 of the "8"-shaped adjustable hole 341.

As shown in FIG. 6, the supporting frame 6 of the present invention can further comprise a wire-wrapping part 62 for wrapping a wire of the transformer.

In the present invention, the functional cartridge 5 can be any cartridge for enhancing or upgrading performance of the apparatus, such as a modulating cartridge, a graphics extension cartridge, a memory extension, or any the like.

By providing the foldable and hang-able liquid crystal display apparatus of the present invention, the device base and the housing as well as the display panel can be complementarily and pivotally folded into a compact structure for being hung as a whole without separating the device base from the housing, so that various posing applications of the apparatus can be obtained.

While the present invention has been particularly shown and described with reference to a preferred embodiment, it will be understood by those skilled in the art that various changes in form and detail may be without departing from the spirit and scope of the present invention.

I claim:

1. A foldable and hang-able liquid crystal display apparatus, comprising:
   a display panel;
   a housing for installing the display panel, further comprising a back side;
   a device base, formed as a box structure, further comprising:
   a first side;
   a second side opposite to the first side and including a plurality of hanging holes; and
   a lateral side, connecting the first side and the second side; and
   a hinge means for pivotally engaging the housing and the device base, further having a plurality of anchoring positions.

2. The foldable and hang-able liquid crystal display apparatus according to claim 1, wherein said first side is contacted with said back side of said housing while said display panel and said device base are folded up through said hinge means.

3. The foldable and hang-able liquid crystal display apparatus according to claim 1, wherein said lateral side further comprises a hook.

4. The foldable and hang-able liquid crystal display apparatus according to claim 1, wherein said hinge means is formed by a pair of pivotal structures.

5. The foldable and hang-able liquid crystal display apparatus according to claim 1, wherein said first side further comprises a receiving valley and a removable shield, the receiving valley further having thereinside an electronic interface for engageable with a foreign functional cartridge, the shield being level with said first side while the shield is fitted to the receiving valley.

6. The foldable and hang-able liquid crystal display apparatus according to claim 1, wherein said first side further comprises thereof a receiving valley for receiving a foreign functional cartridge, the functional cartridge being level with said first side while the functional cartridge engages with an electronic interface inside the receiving valley.

7. The foldable and hang-able liquid crystal display apparatus according to claim 1, wherein said lateral side further comprises an electronic interface engageable with a foreign functional cartridge, both sides of the functional cartridge being level to said first side and said second side while the functional cartridge engaging with the electronic interface.

8. The foldable and hang-able liquid crystal display apparatus according to claim 1 further comprises a supporting frame for loading a transformer, the supporting frame having at least a connection point to engage with at least an adjustable hole located on said lateral side, both sides of a combination of the transformer and the supporting frame being level to said first side and said second side while the combination being engaged with said device base by engaging the connection point and the adjustable hole.

9. The foldable and hang-able liquid crystal display apparatus according to claim 3, wherein said hook further comprises a hook hole and said back side further includes a protrusion engageable with the hook hole, while said display panel and said device base are folded up.

10. The foldable and hang-able liquid crystal display apparatus according to claim 3, wherein said hook is formed as a product having a reinforce metal and a plastic body.

11. The foldable and hang-able liquid crystal display apparatus according to claim 3, wherein said hook has a storage state and an application state, and a part of said hook is located inside said device base while said hook poses the storage state.

12. The foldable and hang-able liquid crystal display apparatus according to claim 8, wherein said supporting frame further comprises a wire-wrapping part for wrapping a wire of said transformer.

13. The foldable and hang-able liquid crystal display apparatus according to claim 8, wherein said adjustable hole is a hole with a plurality of locating zones and a plurality of inner elastic ribs.

14. The foldable and hang-able liquid crystal display apparatus according to claim 11, wherein said hook further comprises a spring for providing resilience to have said hook switching between said storage state and said application state.

15. The foldable and hang-able liquid crystal display apparatus according to claim 11, wherein said hook further comprises thereof at least a directional anchoring thumb forming a block state with said device base while said hook in said application state, and the directional anchoring thumb releasing the block state while the directional anchoring thumb being depressed onto said hook.

16. A foldable and hang-able liquid crystal display apparatus, comprising a display panel, a housing for installing the display panel, and a device base formed as a box structure pivotally engaged with the housing by a hinge means; the device base further comprising a first side, a second side opposed to the first side, and a lateral side connecting the first side and the second side and having a hook; the lateral side further comprising a hook; wherein the hinge means comprising a pair of pivotal structures that present a plurality of anchoring positions.

17. A foldable and hang-able liquid crystal display apparatus according to claim 16 further comprises a supporting frame for loading a transformer, the supporting frame having thereof at least a connection point to engage with at least an adjustable hole located on said lateral side, both sides of a combination of the transformer and the supporting frame being level to said first side and said second side while the combination being engaged with said device base by engaging the connection point and the adjustable hole.

18. The foldable and hang-able liquid crystal display apparatus according to claim 16, wherein said hook includes a spring and at least one directional anchoring thumb for ensuring an application state of said hook; the spring used for providing resilience when moving the hook between a storage state and the application state; the directional anchoring thumb forming a block state with said device base while said hook in the application state, and the directional anchoring thumb releasing the block state while the directional anchoring thumb being depressed onto said hook so to have said hook automatically switch to the storage state by the spring.

19. The foldable and hang-able liquid crystal display apparatus according to claim 17, wherein said supporting frame further comprises a wire-wrapping part for wrapping a wire of said transformer.

20. The foldable and hang-able liquid crystal display apparatus according to claim 18, wherein said hook further comprises thereof a hook hole and said back side further includes a protrusion for engaging with the hook hole while said hook poses said application state.

* * * * *